United States Patent [19]
Bissette

[11] Patent Number: 6,118,082
[45] Date of Patent: *Sep. 12, 2000

[54] SOLID-STATE SLIVER SENSOR AND AUTO-LEVELER FOR TEXTILE MACHINE

[76] Inventor: Paul Branch Bissette, 2136 Shannon Dr., Gastonia, N.C. 28054

[*] Notice: This patent is subject to a terminal disclaimer.

[21] Appl. No.: 09/413,830

[22] Filed: Oct. 6, 1999

Related U.S. Application Data

[63] Continuation of application No. 08/346,496, Nov. 4, 1994, and a continuation of application No. 09/084,940, May 26, 1998, Pat. No. 6,018,129.

[51] Int. Cl.[7] .......................... D01G 23/00; G01G 13/02
[52] U.S. Cl. ........................ 177/116; 177/45; 177/50; 177/25.13; 19/0.23; 19/150; 19/239
[58] Field of Search .................. 177/25.11, 25.13, 177/45, 50, 60, 116, 145, 229; 19/0.23, 65 A, 236, 239, 150; 73/159, 160

[56] References Cited

U.S. PATENT DOCUMENTS

| | | | |
|---|---|---|---|
| 2,716,781 | 9/1955 | Elliott et al. | 19/236 |
| 3,854,330 | 12/1974 | Wildbolz | 73/160 |
| 3,938,223 | 2/1976 | Grice | 73/160 |
| 4,100,649 | 7/1978 | Erismann et al. | 19/0.23 |
| 4,133,207 | 1/1979 | Weidmann et al. | 73/160 |
| 4,163,927 | 8/1979 | Grice, Jr. | 19/240 |
| 4,199,843 | 4/1980 | Leifeld et al. | 19/240 |
| 4,275,483 | 6/1981 | Roberson | 19/240 |
| 4,302,968 | 12/1981 | Moser | 73/160 |
| 4,630,336 | 12/1986 | Schopwindel et al. | 19/288 |
| 4,731,909 | 3/1988 | Duda | 19/105 |
| 4,776,066 | 10/1988 | Leifeld | 19/105 |
| 4,779,310 | 10/1988 | Leifeld | 19/240 |
| 4,791,706 | 12/1988 | Wiening et al. | 19/105 |
| 4,815,547 | 3/1989 | Dillon et al. | 177/25.14 |
| 4,823,597 | 4/1989 | White | 73/160 |
| 4,903,374 | 2/1990 | Hösel | 19/80 R |
| 4,928,355 | 5/1990 | Leifeld | 19/105 |
| 4,930,190 | 6/1990 | Leifeld | 19/105 |
| 4,947,947 | 8/1990 | White | 177/153 |
| 4,949,431 | 8/1990 | Gasser | 19/150 |
| 4,967,384 | 10/1990 | Moliner et al. | 364/567 |
| 5,018,248 | 5/1991 | Haworth et al. | 19/240 |
| 5,052,505 | 10/1991 | Naito et al. | 177/229 |
| 5,067,202 | 11/1991 | Demuth | 19/65 A |
| 5,125,132 | 6/1992 | Weber | 19/105 |
| 5,134,755 | 8/1992 | Jornot et al. | 19/239 |
| 5,152,033 | 10/1992 | White | 19/105 |
| 5,228,171 | 7/1993 | Leifeld | 19/105 |
| 5,230,125 | 7/1993 | Clement et al. | 19/115 R |
| 5,233,728 | 8/1993 | Whiteley et al. | 19/159 R |
| 5,353,201 | 10/1994 | Maeda | 361/816 |
| 5,400,476 | 3/1995 | White | 19/239 |
| 5,433,116 | 7/1995 | Ahlstrom et al. | 73/828 |
| 5,623,128 | 4/1997 | Grimm et al. | 177/25.13 |
| 5,723,826 | 3/1998 | Kitagawa et al. | 177/211 |
| 5,841,077 | 11/1998 | Kolaci | 177/210 R |

*Primary Examiner*—Randy W. Gibson
*Attorney, Agent, or Firm*—Adams Law Firm, P.A.

[57] ABSTRACT

A strain gauge sensor for measuring the unit weight of a moving sliver in a textile machine, comprising a support rigidly mounted on a sliver output end of the textile machine and a trumpet carried by the support for outputting a condensed sliver. At least one strain gauge is carried by the support and responsive to strain imposed on the support by movement of sliver through the trumpet. Electrical circuit is means carried by the support in electrically communicating relation to the strain gauge, and includes a power supply and amplifier carried by the electrical circuit on the support for outputting an excitation voltage and a Wheatstone bridge for receiving the excitation voltage from tile power supply and applying the excitation voltage to the at least one strain gauge, receiving a feedback signal from the strain gauge and outputting a control signal corresponding to the weight of the sliver passing through the trumpet.

13 Claims, 6 Drawing Sheets

SOLID-STATE SLIVER SENSOR AND AUTO-LEVELER FOR TEXTILE MACHINE

This application is a continuation of U.S. Ser. No. 08/346,496, filed Nov. 4, 1994 and U.S. Ser. No. 09/084,940, filed May 26, 1998 now U.S. Pat. No. 6,018,129.

TECHNICAL FIELD AND BACKGROUND OF THE INVENTION

This invention relates to a solid-state sliver sensor for a textile machine, such as a textile card. The sliver sensor may also find application in other machines which process textile strands, particularly in sliver form. The sliver sensor includes a power supply, diagnostic circuitry and amplifier on the unit itself, instead of at a central location fed by electric cable. The sliver sensor generates an output signal to servo-control the output weight of the sliver in an autoleveling system. The autoleveler also utilizes the output signal from the sliver sensor to immediately stop sliver output from the machine if a "choke" occurs, thus preventing damage to drafting rolls and similar components.

Other features, described and claimed below, provide enhanced utility. efficiency and precision in controlling output sliver weight.

U.S. Pat. No. 4,823,597 discloses a measuring device for measuring the unit weight of sliver as it passes through a trumpet. The trumpet includes a trumpet gauge plate for supporting the trumpet and a pair of weighted elements mounted on each side of the plate. The plate includes upper, lower and central portions wherein the lower portion includes an opening for supporting the trumpet and the central portion has a reduced cross section. A plurality of strain gauges for detecting deflections are mounted on front and rear surfaces of the central portions adjacent the lower portion and the weighted elements. The strain gauges are electrically connected in a modified Wheatstone configuration. Deflection sensing in strain gauges adjacent the weighted elements cancel out deflection sensing produced by external vibrations to produce an accurate measurement of the sliver weight.

U.S. Pat. No. 4,947,947 discloses a measuring device for measuring the unit weight of sliver as it passes through a trumpet. The device includes a trumpet gauge plate for supporting the trumpet and a vibration compensating element mounted on the plate. A plurality of strain gauges for detecting deflections are mounted on front and rear surfaces of a central portion of the plate adjacent a lower portion and the compensating element. The plate is mounted on support means, for example, a pair of spring supports, which allow the trumpet to move in response to an overload to eliminate damage to the plate, particularly its central portion where the strain gauges are mounted and to return to. its normal position after the overload is gone. During normal operation, without an overload, deflection sensing produced by external vibrations cancel out to produce an accurate measurement of the sliver weight. During an overload the trumpet moves to a new position to avoid damage to the plate, and then returns after the overload is gone enabling the measuring operation to continue.

SUMMARY OF THE INVENTION

Therefore, it is an object of the invention to provide a sliver sensor for an autoleveler which has a solid-state power supply in the sliver sensor unit itself instead of at a remote location.

It is another object of the invention to provide an sliver sensor which uses servo-feedback means to control sliver weight in a textile machine.

It is another object of the invention to provide an sliver sensor which provides for an immediate shut-off in the event of a choke in order to prevent damage to the trumpet, drafting rolls, and other machine components.

It is another object to provide an autoleveler for a textile machine which includes a solid state sliver sensor as disclosed in this application.

These and other objects of the present invention are achieved in the preferred embodiments disclosed below by providing a strain gauge sensor for measuring the unit weight of a moving sliver in a textile machine, comprising a support rigidly mounted on a sliver output end of the textile machine and a trumpet carried by the support for outputting a condensed sliver. At least one strain gauge is carried by the support and responsive to strain imposed on the support by movement of sliver through the trumpet. Electrical circuit is means carried by the support in electrically communicating relation to the strain gauge, and includes a power supply and amplifier carried by the electrical circuit on the support for outputting an excitation voltage and a Wheatstone bridge for receiving the excitation voltage from the power supply and applying the excitation voltage to the at least one strain gauge, receiving a feedback signal from the strain gauge and outputting a control signal corresponding to the weight of the sliver passing through the trumpet.

According to one preferred embodiment of the invention, the electrical circuit means includes a low-pass filter for filtering extraneous electronic signals from the electrical circuit means.

According to another preferred embodiment of the invention, the electrical circuit means includes excitation voltage status means for detecting the presence of proper excitation voltage from the power supply and indicating proper output signals.

According to yet another preferred embodiment of the invention, choke-detecting means are provided for detecting the presence of a sliver choke in the trumpet and halting the passage of sliver through the trumpet upon detection of a choke in the sliver trumpet.

According to yet another preferred embodiment of the invention, the choke-detecting means includes a motor controller controlling the speed of a drafting roll for pulling the sliver through the trumpet.

Preferably, the motor controller comprises motor circuit means responsive to the control signal from the strain gauge indicating sliver weight of a magnitude indicative of a sliver choke for stopping rotation of the drafting roll.

According to one preferred embodiment of the invention, the sliver weight controlling means is responsive to the control signal and a motor controller controls the speed of a drafting roll for pulling the sliver through the trumpet.

According to another preferred embodiment of the invention, the motor controller is responsive to the control signal for controlling the speed of the drafting roll to maintain the strain of the sliver moving through the trumpet at a magnitude indicative of a predetermined desired sliver weight.

According to yet another preferred embodiment of the invention, the support comprises a base, bridge means integrally formed at one end thereof to the base, the bridge having a width and depth of reduced dimension relative to the base to isolate sliver-induced strain, the strain gauge attached to and carried by the bridge for sensing strain thereon; a trumpet-carrying bracket integrally formed at a second end of the bridge; and electrical circuit mounting means carried by the base for mounting the electrical circuit.

According to one preferred embodiment of the invention, the electrical circuit mounting means comprises a recess formed in the base.

According to yet another preferred embodiment of the invention, the bridge means comprises first and second spaced-apart bridges, wherein respective first and second strain gauges on upstream and downstream sides of the bridges sense corresponding compressive and expansive strain on the bridges.

According to yet another preferred embodiment of the invention, the support includes an attachment bracket for direct connection to the textile machine, the attachment bracket carrying the other elements of the support.

Preferably, the support includes a protective cover for being removably positioned on the base for covering the recess and the electrical circuit means therein.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Overview of Operation

Figure 1:
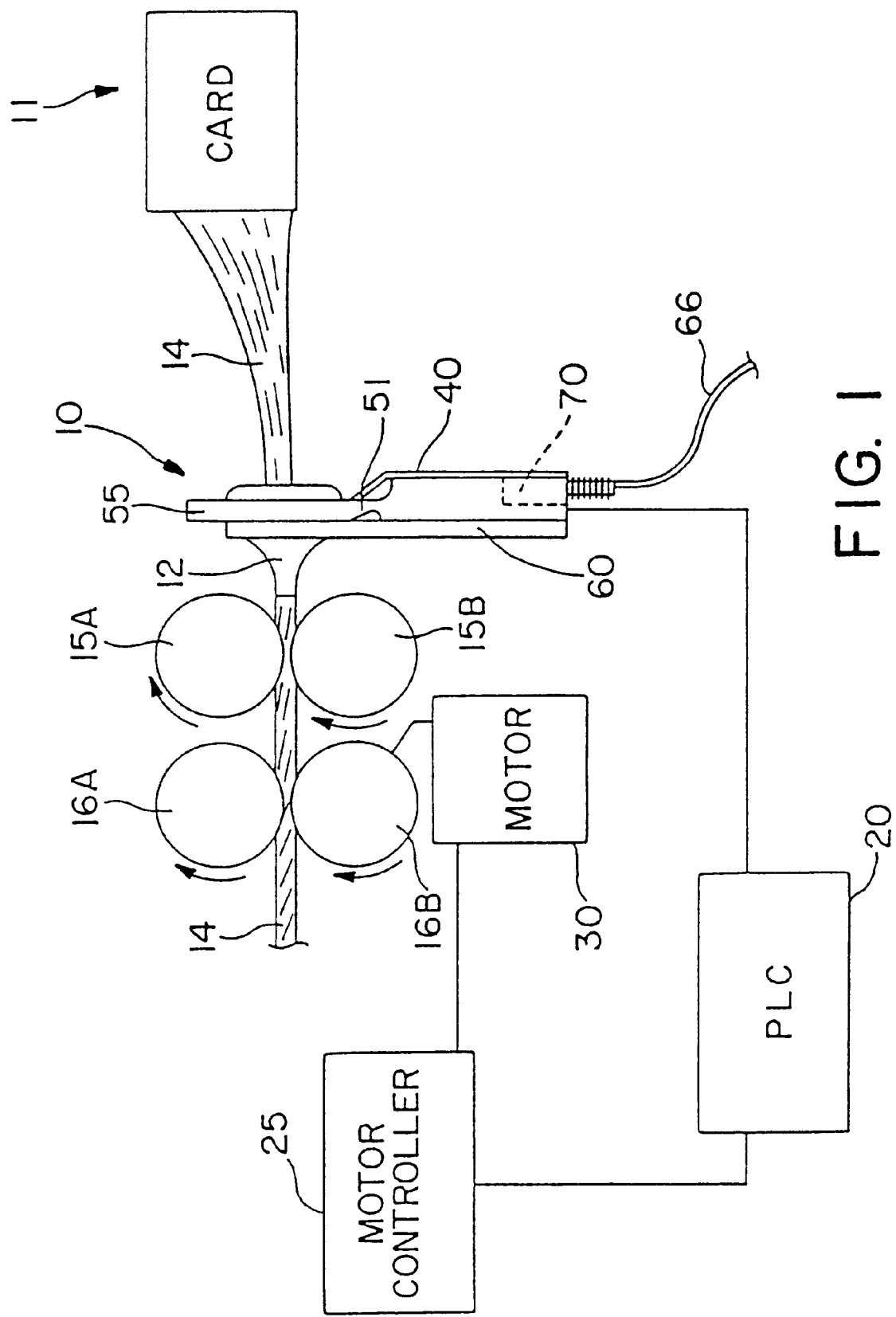
FIG. 1 is a schematic diagram of the autoleveler and related components as used on a textile card.

Referring now specifically to the drawings, an autoleveler according to the present invention is illustrated in FIG. 1 and shown generally at reference numeral 10. The sliver sensor 10 operates to control the weight of sliver passing from the web-forming area of a textile card 11 into a web-condensing trumpet 12. The trumpet 12 accepts a web 13 and condenses it into a loosely bound-together sliver 14. The sliver passes between a first set of drafting rolls 15A, 15B and a second set of drafting rolls 16A, 16B. The drafting rolls 15A, 15B and 16A, 16B control the weight of the sliver by pulling sliver at a predetermined target speed through the trumpet 12. The moving sliver, in turn, creates a strain on the trumpet 12. The speed of rotation of the drafting rolls 15A, 15B is adjusted to a target level for a proper weight of sliver.

Signals output from the sliver sensor 10 responsive to the action of strain gauges are transmitted by wire to a Programmable Logic Controller (PLC) 20 or a computer (not shown). The PLC 20 outputs a signal to a motor controller 25 which is controls the speed of the motor 30 and thus the second set of drafting rolls 16A, 16B. As described in more detail below, the speed of the second set of drafting rolls 16A, 16B is increased or decreased to control the weight of the sliver.

Detailed Description of Structure

Figure 2:
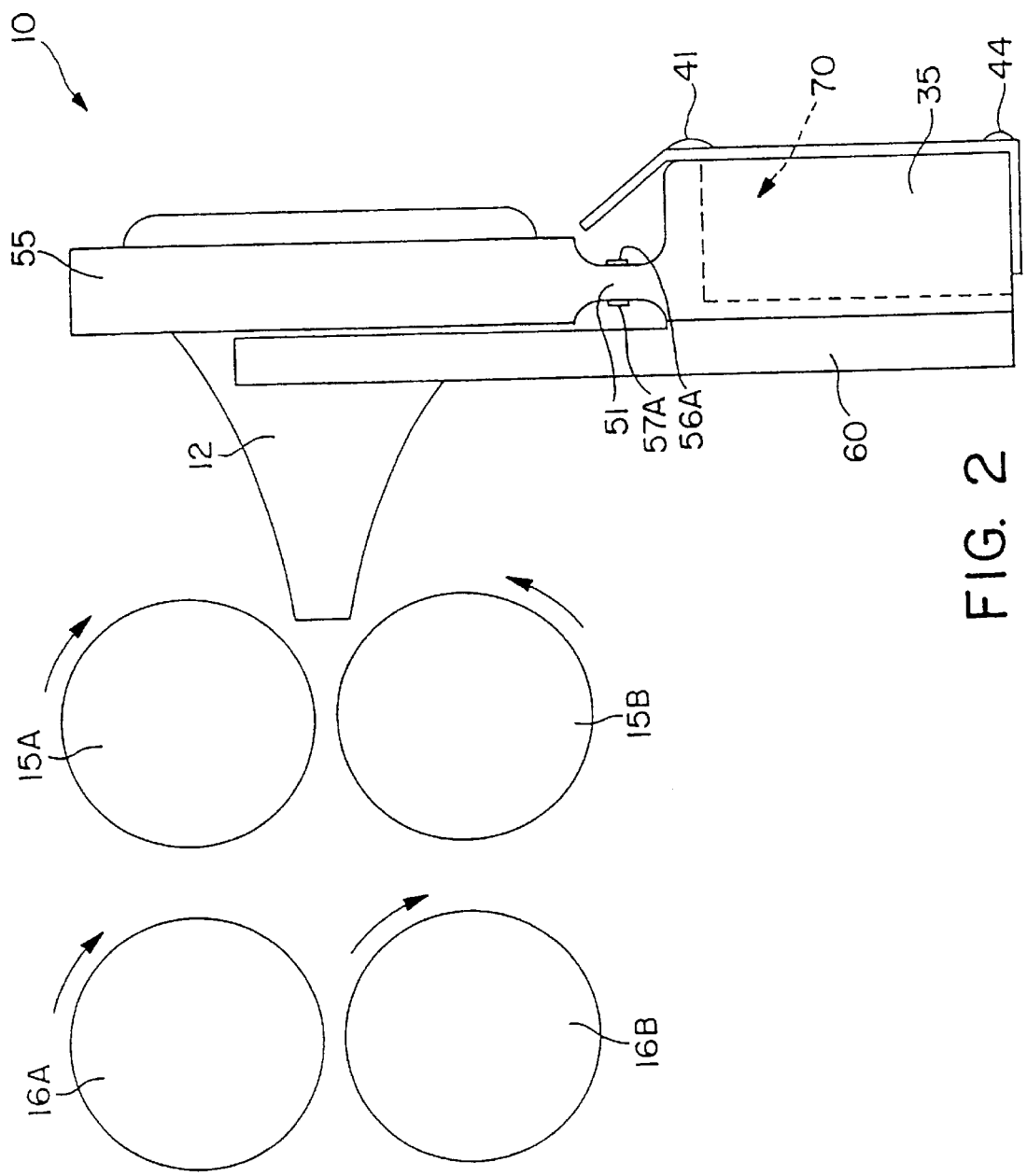
FIG. 2 is a side elevation of the sliver sensor support with sliver trumpet showing its proximity to the drafting rolls of a textile machine such as a card.
Figure 3:
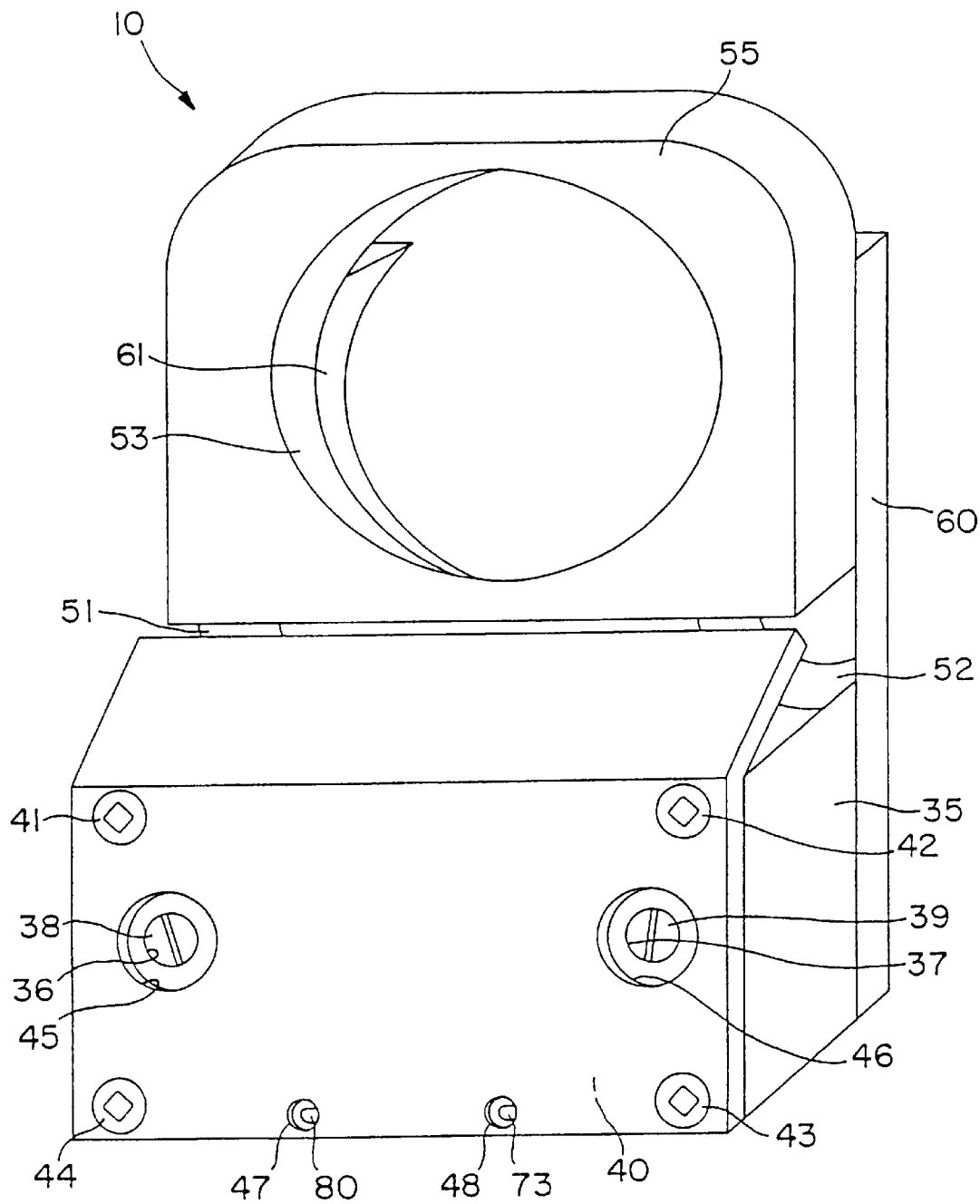
FIG. 3 is a perspective view of the sliver sensor support.

Referring now to FIGS. 2 and 3, the sliver sensor 10 includes a base 35 with a pair of bolt holes 36 and 37 for receiving a pair of bolts 38 and 39. Bolts 38 and 39 hold the sliver sensor 10 onto the card 11. Base 35 is normally protected by a cover 40, which is attached to the base 35 by four screws 41–44 through appropriately-sized screw holes. Cover 40 also includes two access holes 45 and 46 to permit removal of the sliver sensor 10 from, and reattachment to, the card 11. Two apertures 47 and 48 in cover 40 provide visual access to two LEDs which provide information concerning the operation of the circuitry, described below.

Figure 4:
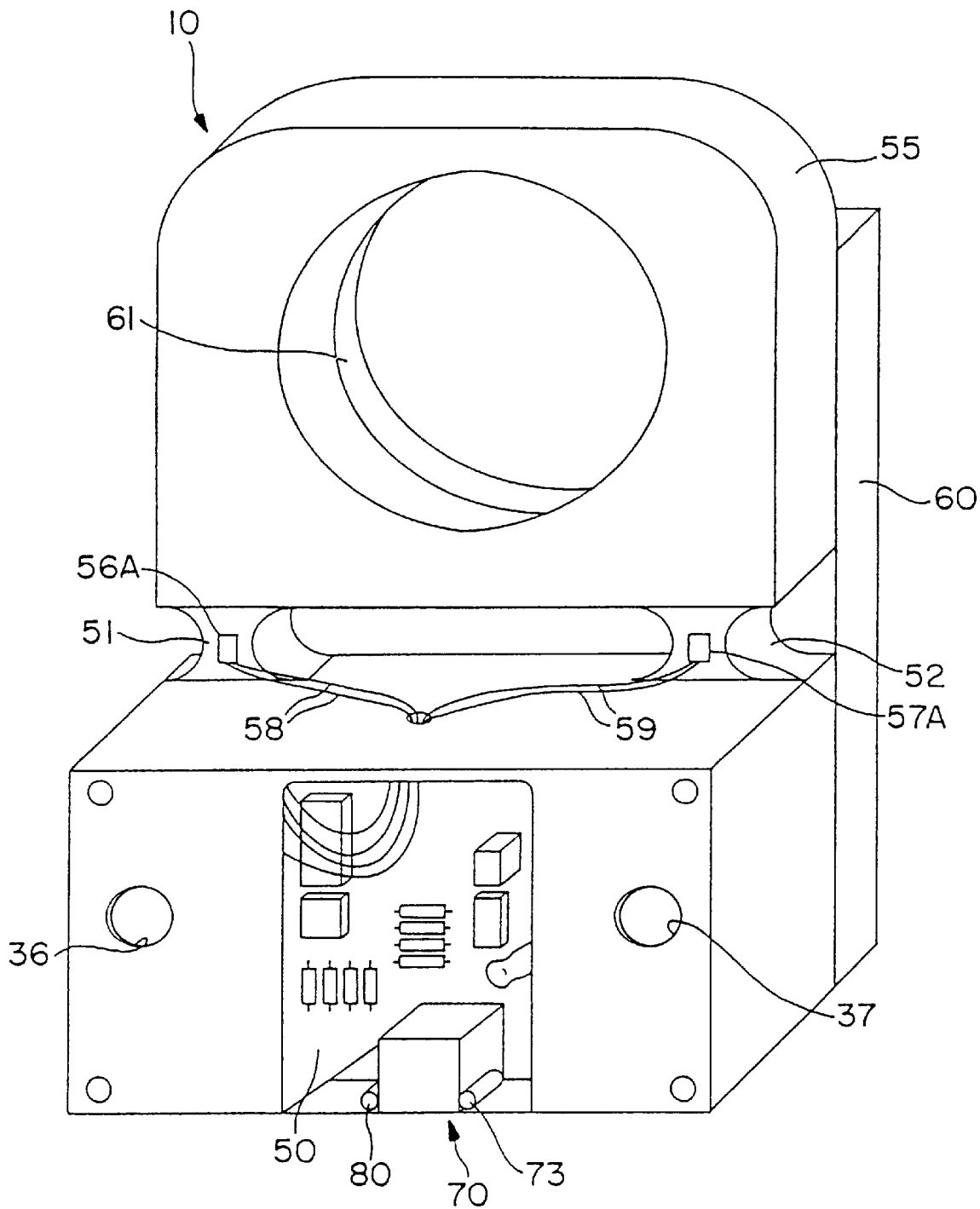
FIG. 4 is a perspective view of the sliver sensor support with the cover removed to shown the location of the on-board circuitry and power supply.

Referring now to FIG. 3, the cover 35 has been removed for clarity. Base 35 includes a recess 50 in which the circuit is positioned. Integrally formed bridges 51 and 52 extend upwardly from the top of the base 35. The bridges 51 and 52 are narrower in both width and depth than the surrounding structure. An integrally formed bracket 55 is formed at the end of the bridges 51 and 52 opposite the end of the bridges 51 and 52 formed to the base 35. Thus, the bracket 55 is held in vertically spaced-apart relation to the base 35 by the bridges 51 and 52. The narrowed bridges 51 and 52 form areas of enhanced sensitively to strain because of their reduced dimensions. Strain gauges 56A and 57A. for example, foil-type strain gauges, are cemented directly to the front side of bridges 51 and 52, respectively, as shown in FIG. 4. Although not shown in FIG. 3, strain gauges 56B and 57B are cemented to the back side of the bridges 51, and 52. See, FIG. 6. Wire filament leads 58 and 59 transmit signals to and from the strain gauges 56A, 56B and 57A. 57B.

Although not shown or further described, one or two strain gauges can be used in lieu of the four strain gauges disclosed in this application, with reduced sensitivity.

A large annular opening 53 is formed in the trumpet-carrying bracket 55 and receives and carries the trumpet 12, as shown in FIG. 2. An attachment bracket 60 is mounted to the back of the base 35 and supports the entire structure on the textile card 11. Attachment bracket 60 extends along the entire width and length of the base 35 in direct contact with the base 35, and extends upwardly and behind bridges 51 and 52 and the bracket 55. Note in FIG. 2 that the attachment bracket 60 does not contact either the bridges 51 and 52 or the bracket 55, but is spaced apart from the bracket 55.

The top portion of the attachment bracket 60 includes an annular recess 61 corresponding generally with the shape of the annular opening 53 in trumpet bracket 55 to permit the trumpet 12 to extend through both structures. See FIGS. 2 and 4.

Figure 5:
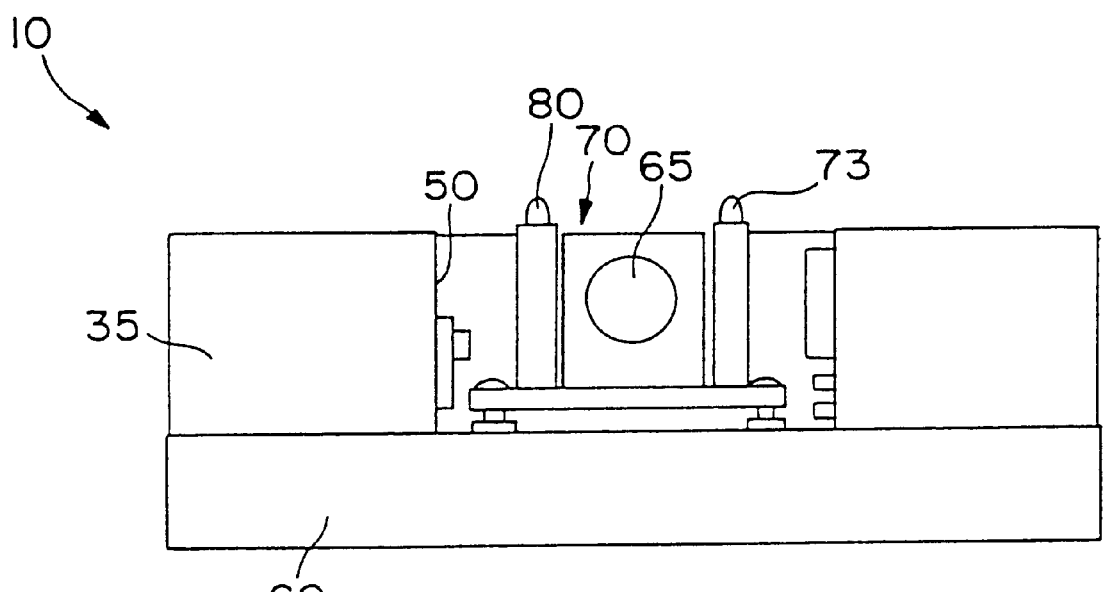
FIG. 5 is a bottom view of the sliver sensor support with cover removed.

Referring to FIG. 5, electric current, in the form of 24 Volts DC is transmitted to sliver sensor 10 by wire, and accesses the sliver sensor 10 through a female receptacle 65. The receptacle 65 faces downwardly and accepts a mating male connector plug 66 (FIG. 1) connected to a 24 Volt DC power source such as powers the other electrically operated equipment in conventional industrial controls.

Detailed Description of Circuit

Figure 6:
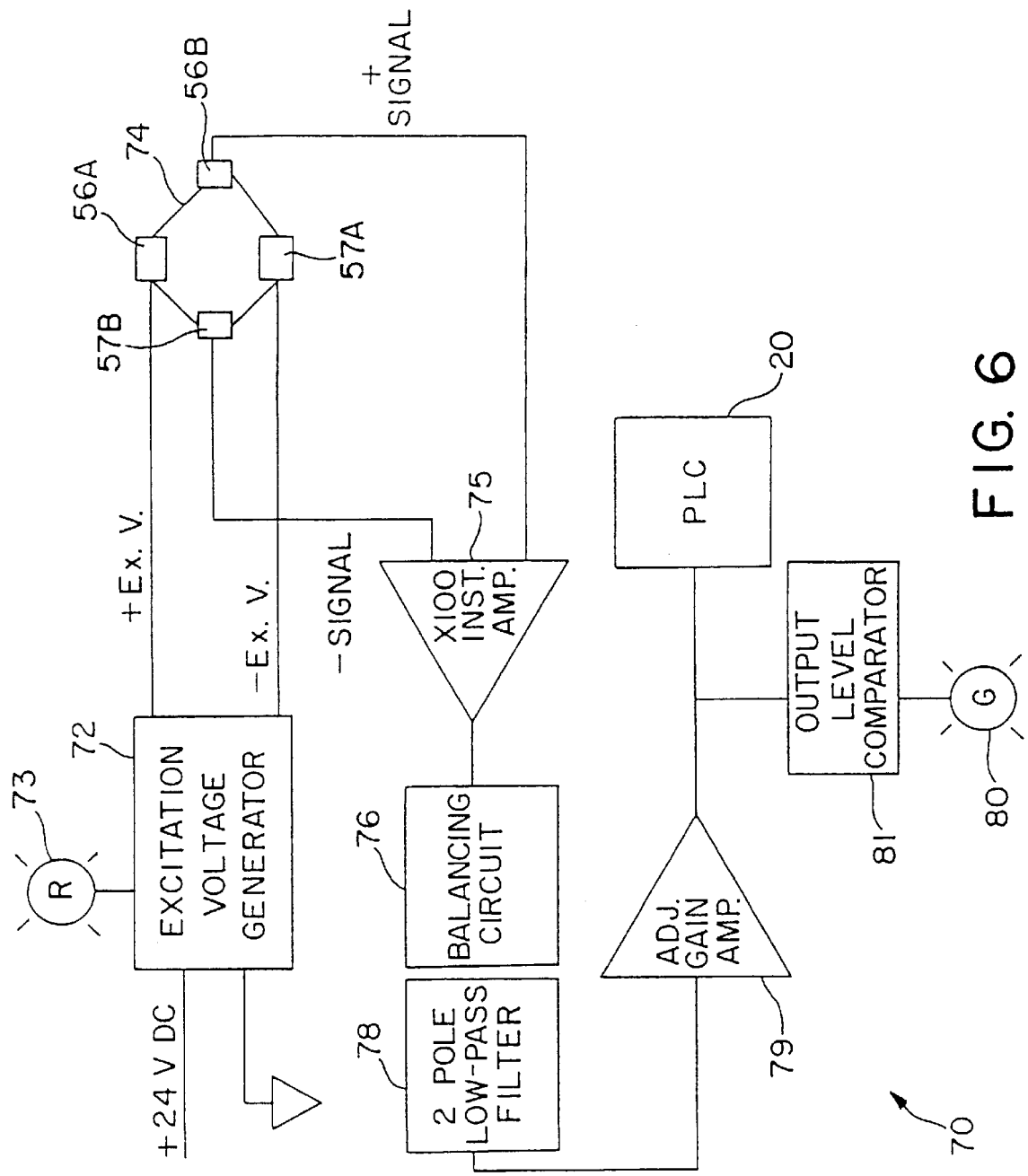
FIG. 6 is a schematic diagram of the sliver sensor circuit.

Referring now to FIG. 6, circuit 70, which operates the sliver sensor 10, is shown schematically. The +24V DC is transmitted to a excitation voltage generator 72, which generates and transmits two excitation voltages—one positive 12 V DC and one negative 12 V DC. A red indicator light 73 is lit by the generator 72 when the +24V DC has been properly received by the generator 72 and two proper excitation voltages have been generated. The red indicator light is displayed through the aperture 48 on the front of the cover 40.

The two excitation voltages are delivered to a Wheatstone bridge circuit 74 which includes the four strain gauges 56A, 56B and 57A, 57B as the four arms of the circuit. Each of the strain gauges 56A, 56B and 57A, 57B has a resistance of 2000 ohms. The strain gauges 56A, 56B and 57A, 57B are placed on opposite sides of the bridges 51, 52 so that when strain gauges 56A, 57A are sensing expansive stress resulting from movement of sliver through the trumpet 12, corresponding compressive stress occurs on the strain gauges 56B, 57B on the back side of the bridges 51, 52. The strain on the bridges 51 and 52 induce a change in the excitation voltages through the strain gauges 56A, 56B, 57A, 57B which are output from the Wheatstone bridge 74. Strain on the sliver sensor 10 caused by passage of the fiber through the trumpet 12 causes the positive signal to be greater in magnitude than the negative voltage, causing a positive differential output signal. Since the excitation signals are generated at the sensing location instead of remotely at, for example, a remote control cabinet, they are substantially less subject to degradation by outside electronic noise.

The output voltages are sent to an instrumentation amplifier 75 where the voltages combined and increased by a factor of 100. Locating this amplifier at the source of the signal is more effective and less prone to spurious signals than locating the amplifier remotely, as is done in prior art devices.

The output voltage from the amplifier 75 is sent to a balancing circuit 76 where the voltage is adjusted to correct manufacturing variations in the strain gauges and to achieve a balanced null output when the system is, in fact, balanced.

The balanced voltage is then sent to a two pole low pass filter 78 where frequencies over 40 Hz. are filtered from the signal and frequencies under 40 Hz. are passed through. The filter 78 is much more effective when placed in the circuit 70, since no long transmission of the filtered signal, which can cause further spurious signals to be acquired, is required. The filtered signal is passed to an adjustable gain amplifier 79 which multiplies the signal by a factor of six, and permits the signal to be calibrated to the exact known thickness of the metal in the sliver sensor 10, so that a known quantity of fiber passing through the trumpet 12 and producing a given strain will always produce the same signal.

The signal is transmitted to an output level comparator 81 where the voltage is compared against preset standards indicating various operating conditions, as explained further below.

A green signal light 80 visible through aperture 47 in cover 40 indicates that a signal has been received from the strain gauges 56 and 57, and that a proper output signal has been produced. The green light 80 should always be lit when the sliver sensor 10 is operating within the normal output voltage range of 2–7 V.

The signal from the amplifier 79 is transmitted to either a computer or PLC 20.

Referring again to FIG. 1, the signal from the PLC 20 is output to motor controller 25. At a nominal voltage, motor controller does nothing more than maintain the speed of the drafting rolls 16A, 16B at a constant speed, thus causing uniform drafting of the sliver between the drafting rolls 15A, 15B and 16A, 16B.

Detailed Description of Operation

Variations in the weight of the sliver passing through the trumpet 12 cause minute variations in the strain on the sliver sensor 10, which are sensed by the strain gauges 56A, 56B and 57A, 57B, causing a variation in the output voltage, as described above. The processed signal from the circuit 70 is thus indicative of an instantaneous variation upstream of the drafting rolls 16A, 16B. The motor controller 25 reacts to receipt of this output signal by changing the speed of the motor 30 and thus the speed of rotation of the drafting rolls 16A, 16B. Indication of heavier-than-nominal sliver weight generates a higher voltage signal, which causes the motor controller 25 to increase the speed of the drafting rolls 16A, 16B. This increased speed provides greater drafting between the drafting rolls 16A, 16B and 15A, 15B, thus reducing the weight of the sliver back down to nominal.

Indication of lighter-than-nominal sliver weight generates a lower voltage signal, which causes the motor controller 25 to decrease the speed of the drafting rolls 16A, 16B. This decreased speed provides less drafting between the drafting rolls 16A, 16B and 15A, 15B, thus increasing the weight of the sliver back up to nominal.

According to a preferred embodiment of the invention, the sensor output voltage to the PLC 20 is 1.00 VDC with no fiber in the trumpet. The lowest acceptable output voltage with fiber in the trumpet is 2.30 VDC. At and above this level the green light 80 is lit.

The best acceptable voltage level with proper weight of sliver in the trumpet is 4.00 VDC. If this level represents the proper weight sliver, then the drafting rolls 16A, 16B, 15A, 15B operate at the target speed and draft.

The highest acceptable level with proper weight of sliver in the trumpet is 7.00 VDC. Above this level the green light 80 goes out, indicating a seriously out-of-tolerance weight of sliver.

The sliver sensor 10 also includes an anti-choke feature which stops the card 11 if a choke occurs. A choke is a condition which results when a large wad of sliver becomes trapped in the trumpet 12. The drafting rolls 15A, 15B will continue to pull some fiber through the trumpet, but more and more builds up behind the trumpet. This condition can cause damage to the drafting rolls 15A, 15B, the sliver sensor 10, as well as other carding components. If the voltage rises to above 9.50 VDC, the motor controller is signaled by the PLC 20 to shut off current to the motor 30, stopping the rotation of the drafting rolls and preventing damage to the card 11. The green light also goes out to provide a visual indication of the problem. Of course, this condition can be relayed by the PLC 20 to any other alarm, such as a warning light or bell, to provide an indication that the card 11 needs attention. The output level comparator 81 compares these voltages against preset standards, as described above, and controls the light 80.

The high level outputs as described above are much less prone to electrical interference than low level outputs in the range of 0–10 mV.

An autoleveler is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A sliver monitor for monitoring the unit weight of a moving sliver in a textile machine, comprising:
   (a) a support rigidly mounted on a sliver output end of said textile machine;
   (b) a trumpet carried by said support for outputting a condensed sliver;

(c) at least one strain gauge carried by said support and responsive to strain imposed on said support by movement of sliver through said trumpet;
(d) analog electrical circuit means carried on said support in electrically communicating relation and in close proximity to said strain gauge, and including:
(1) a power supply carried by said electrical circuit on said support for outputting an excitation voltage; and
(2) a Wheatstone bridge for receiving the excitation voltage from said power supply and applying the excitation voltage to said at least one strain gauge; and
(3) amplifier circuit means carried on said support for receiving a feedback signal from said strain gauge and outputting an amplified analog control signal corresponding to the weight of the sliver passing through the trumpet in order to render the output analog signal less prone to electrical interference than the feedback signal from the strain gauge; and
(e) data processing and storage means for receiving and storing the amplified analog control signal for further processing.

2. A sliver monitor according to claim 1, wherein said electrical circuit means includes a low-pass filter for filtering extraneous electronic noise from said electrical circuit means.

3. A sliver monitor according to claim 2, wherein said electrical circuit means includes excitation voltage status means for detecting the presence of proper excitation voltage from said power supply.

4. A sliver monitor according to claim 2, and including choke-detecting means for detecting the presence of a sliver choke in the trumpet and halting the passage of sliver through the trumpet upon detection of a choke in the sliver trumpet.

5. A sliver monitor according to claim 2, wherein said support comprises:
(a) a base;
(b) bridge means integrally formed at one end thereof to said base, said bridge having a width and depth of reduced dimension relative to said base to isolate sliver-induced strain, said strain gauge attached to and carried by said bridge for sensing strain thereon;
(c) a trumpet-carrying bracket integrally formed at a second end of said bridge; and
(d) electrical circuit mounting means carried by said base for mounting said electrical circuit.

6. A sliver monitor according to claim 5, wherein said electrical circuit mounting means comprises a recess formed in said base.

7. A sliver monitor according to claim 6, wherein said bridge means comprises first and second spaced-apart bridges, and wherein said first and second bridges carry respective first and second strain gauges on upstream and downstream sides thereof for sensing corresponding compressive and expansive strain on said bridges.

8. A sliver monitor according to claim 1, wherein said data processing and storage means comprises programmable logic controller (PLC).

9. A sliver monitor according to claim 1, wherein said data processing and storage means comprises a computer.

10. A sliver monitor for controlling the unit weight of a moving sliver in a textile machine, comprising:
(a) a support rigidly mounted on a sliver output end of said textile machine;
(b) a trumpet carried by said support for outputting a condensed sliver;
(c) at least one strain gauge carried by said support and responsive to strain imposed on said support by movement of sliver through said trumpet;
(d) analog electrical circuit means carried by said support in electrically communicating relation to said strain gauge, and including:
(1) a power supply carried by said electrical circuit on said support for outputting an excitation voltage;
(2) a Wheatstone bridge for receiving the excitation voltage from said power supply and applying the excitation voltage to said at least one strain gauge, receiving a feedback signal from said strain gauge and outputting a low level voltage control signal corresponding to the weight of the sliver passing through the trumpet;
(3) an amplifier carried by said electrical circuit on said support for amplifying the low level voltage analog control signal from the strain gauges into a high level analog signal suitable for processing in a computer;
(4) level detector and status indicator means carried by said electrical circuit on said support to detect and indicate proper excitation voltages and proper level output signals; and
(d) motor controller means for receiving the amplified analog control signal and controlling the speed of drafting roll means in response to said amplified analog control signal for pulling the sliver through the trumpet at a predetermined rate to maintain the strain of the sliver moving through the trumpet at a magnitude indicative of a predetermined desired sliver weight; and
(e) data processing and storage means for receiving and storing the amplified analog control signal for further processing.

11. A method of monitoring the unit weight of a moving sliver in a textile machine, comprising:
(a) providing a support rigidly mounted on a sliver output end of said textile machine, a trumpet carried by said support for outputting a condensed sliver, at least one strain gauge carried by said support and responsive to strain imposed on said support by movement of sliver through said trumpet, and analog electrical circuit means carried by said support in electrically communicating relation to said strain gauge;
(b) outputting an excitation voltage from a power supply;
(c) receiving the excitation voltage from said power supply at a Wheatstone bridge;
(d) applying the excitation voltage to said at least one strain gauge,
(e) receiving a feedback signal from said strain gauge and outputting a low level voltage control signal corresponding to the weight of the sliver passing through the trumpet;
(f) amplifying the low level voltage analog control signal from the strain gauges into a high level analog signal suitable for processing in a computer; and
(g) transmitting the high level analog signal data to a data processing and storage means for receiving and storing the amplified analog control signal for further processing.

12. A method according to claim 11, wherein the step of transmitting the high level analog signal data comprises the step of transmitting the data to a programmable logic controller (PLC).

13. A method according to claim 11, wherein the step of transmitting the high level analog signal data comprises the step of transmitting the data to a computer.

\* \* \* \* \*